(12) United States Patent
Uno

(10) Patent No.: US 7,580,078 B2
(45) Date of Patent: Aug. 25, 2009

(54) SYNC SEPARATOR APPARATUS

(75) Inventor: Yasuhiro Uno, Souraku-gun (JP)

(73) Assignee: Panasonic Corporation, Osaka (JP)

( * ) Notice: Subject to any disclaimer, the term of this patent is extended or adjusted under 35 U.S.C. 154(b) by 747 days.

(21) Appl. No.: 11/336,783

(22) Filed: Jan. 23, 2006

(65) Prior Publication Data
US 2006/0164548 A1    Jul. 27, 2006

(30) Foreign Application Priority Data
Jan. 25, 2005    (JP) .............................. 2005-016828

(51) Int. Cl.
*H04N 5/08*    (2006.01)
(52) U.S. Cl. ...................... 348/525; 348/536
(58) Field of Classification Search ................ 348/525, 348/500, 526, 529, 530, 531, 536; *H04N 5/04, H04N 9/44, 5/08, 5/10*
See application file for complete search history.

(56) References Cited

U.S. PATENT DOCUMENTS 6,587,139 B1 *   7/2003   Hirao ........................ 348/536
7,208,995 B2 *   4/2007   Hashimoto ................. 327/536

FOREIGN PATENT DOCUMENTS

JP        57124971        8/1982

* cited by examiner

*Primary Examiner*—Sherrie Hsia
(74) *Attorney, Agent, or Firm*—Dickinson Wright, PLLC

(57) ABSTRACT

An input video signal is inputted into a first clamp circuit, and then inputted into a second clamp circuit as a clamped video signal so as to be inputted into a switch circuit. The second clamp circuit uses a clamp pulse for clamping a video signal within the period of the sync signal that has been created by a clamp timing generator in the rear stage, and outputs a clamped video signal. The video signal has been clamped so as to be pulled into a constant DC voltage, and absorbs the waviness of a sag that superimposes the video signal. This video signal makes it possible to gain a sync output signal which has been sync separated from a sync separator circuit and has no jitter in the output.

12 Claims, 8 Drawing Sheets

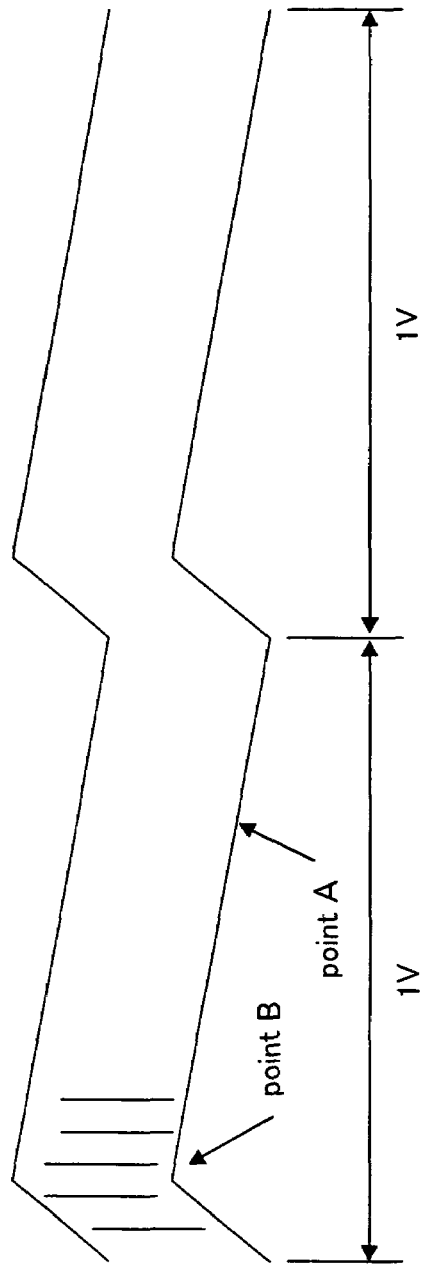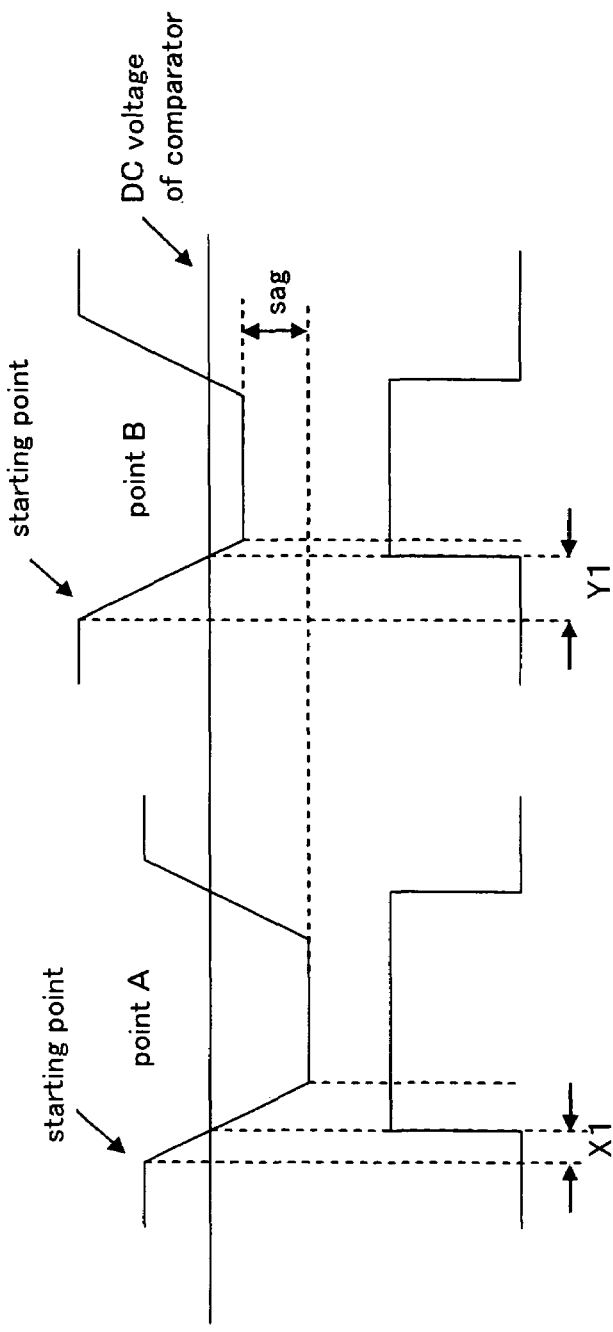

locus of bottom of sync signal outputted from second clamp circuit 104 input signal and DC voltage of comparator for sync separating sync output signal

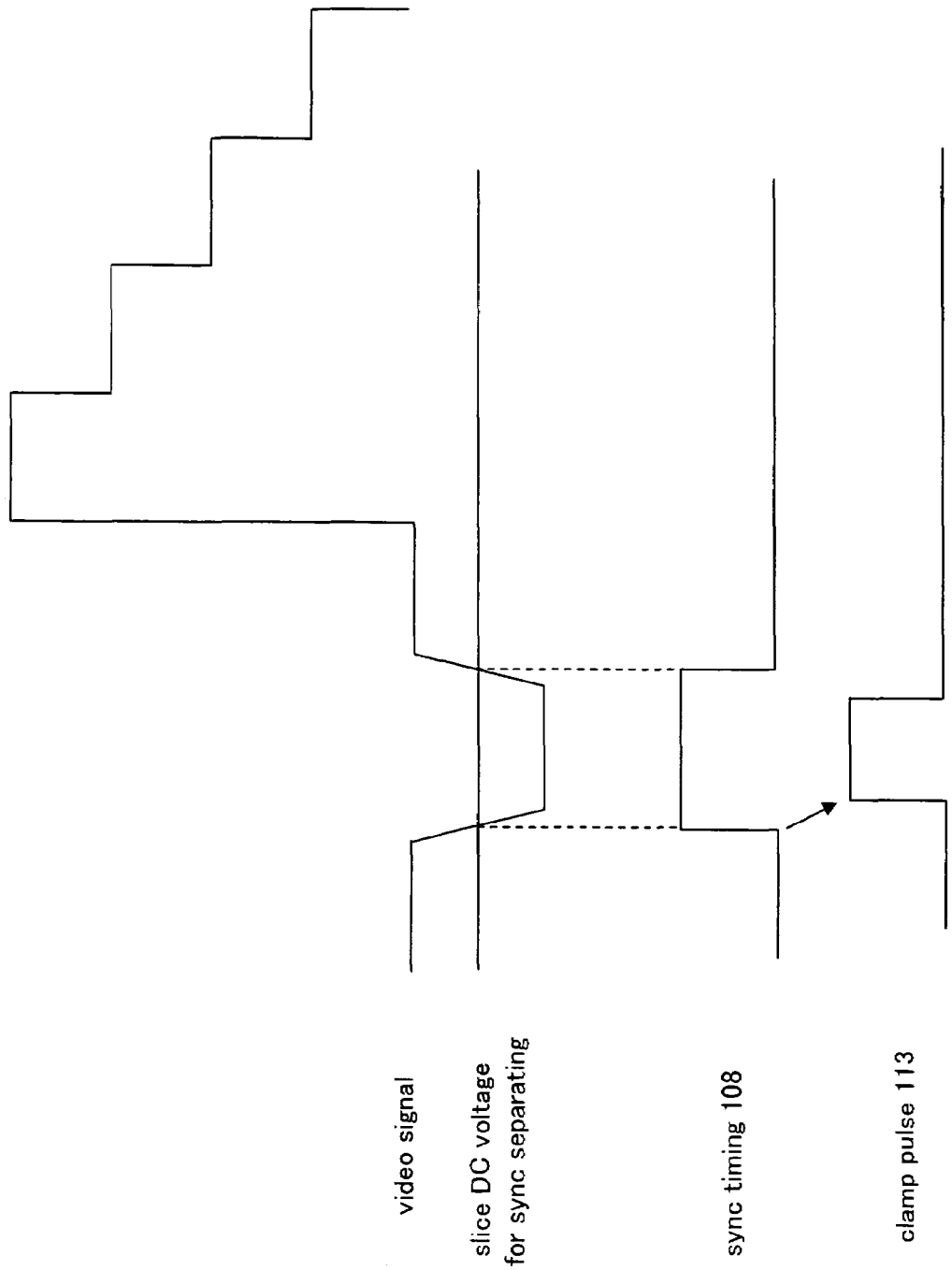

SYNC SEPARATOR APPARATUS

BACKGROUND OF THE INVENTION

1. Field of the Invention

The present invention relates to a sync separator apparatus which, in a display unit having a function of receiving a video signal for a television set, stably separates a sync signal that is required for displaying a video on the display unit from a video signal.

2. Prior Art

As for the conventional methods for separating a sync signal from a video signal, sync separator circuits as that shown in Patent Document 1 have been proposed. In the following, the sync separator circuit that is disclosed in Patent Document 1 is described in reference to FIG. 8.

As shown in FIG. 8, this sync separator circuit has a configuration where a composite video signal 1 is inputted into a first clamp circuit 2 and a second clamp circuit 3 that has been additionally provided. The time constant CR of first clamp circuit 2 is relatively large, making a jitter small at the front edge of sync due to the video level being high or low. Accordingly, a jitter at the front edge of a sync signal 5 that has been separated from this signal by means of a comparator 4 is also small. Meanwhile, the time constant of second clamp circuit 3 is relatively small, making a clamp pulse 7 occur in a slice circuit 6 in a short period of time so that, even in the case where the signal has been switched to a signal having a different average video level, first and second clamp circuits 2 and 3 clamp the signal after being switched in a short period of time. In this manner, a sync separator circuit which has a small change in the front edge due to the video level and a quick response can be put into practice.

Patent Document 1: Japanese Unexamined Patent Publication S57 (1982)-124971

In a sync separator circuit having such a configuration, a configuration, in which a clamp circuit having a large time constant and a clamp circuit having a small time constant are combined, is used, and thereby, the response of sync separation can be made relatively quick even when the average DC voltage of the inputted video signals suddenly changes. However, the number of unstable factors for carrying out sync separation using the above described sync separator circuit increases in the following conditions of use.

Conventional signal sources are signals only of 480i (interlace signal having a number of scanning lines of 480) for the NTSC system and of 576i (interlace signal having a number of scanning lines of 576) for the PAL system in the case of only analog surface wave broadcasting. As a result of the spread of digital television sets in recent years, however, 1080i is used in addition to the above described signals, and 720p (progressive signal having a number of scanning lines of 720) have appeared as a recording medium for cameras. In addition, as a result of the spread of DVD players, 480p and 576p, which have the density twice as high as that of 480i and 576i, have also come into use as video signals.

Accordingly, in television sets in recent years, signals which are inputted into a sync separator circuit are not of a single type, and it becomes necessary for sync separator apparatuses to correspond to various types of video format signals.

In the above described configuration of FIG. 8, however, no sync separation is carried out on video formats where the width of the sync signal, the horizontal frequency rate and the number of scanning lines are different from each other. Furthermore, there are many types in the width of the sync signals for High Definition (hereinafter, referred to as HD) and Standard Definition (hereinafter, referred to as SD) systems, and the width of the sync signal is as narrow as 540 nsec in the format of 720p.

Therefore, in the case where a video signal such as the above described 720p is inputted, the clamp pulse spreads from the conventional clamp period, making it possible that problems may arise where the clamp period overlaps the sync signal period and the video signal period or the clamp period conversely becomes short relative to the width of the sync signal.

In addition, first clamp circuit 2 and second clamp circuit 3 shown in FIG. 8 can receive signals even in the state where there are no clamp pulses, and therefore, a sync tip clamp circuit should be incorporated into the clamp circuit. In addition, it is also shown that the clamp operation can be carried out using a clamp pulse, and therefore, a gate clamp circuit which uses a clamp pulse and carries out a clamp operation according to the timing of the clamp pulse should also be incorporated. Accordingly, first and second clamp circuits 2 and 3, respectively, have the above described two types of clamp circuits incorporated therein, and therefore, the sync separator circuit shown in Patent Document 1 has a configuration where four clamp circuits in total are used.

Furthermore, the period when clamping using a clamp pulse is unclear in the configuration shown in FIG. 8, and therefore, there should be a possibility where a scratch which occurs along with clamping in the gate clamp circuit appears as noise on the display.

SUMMARY OF THE INVENTION

The present invention intends to solve the problems of the above described prior art, and an object thereof is to provide a sync separator apparatus for stably sync separating a sync signal from a video signal in a systematic manner on the basis of the function of clamping according to sync signal timing, the result of determination by the format detection circuit, lock information on the AFC (Automatic Frequency Control) circuit, and the like.

In order to achieve the above described object, a sync separator apparatus according to the present invention is provided with: a first clamp circuit for sync tip clamping a video signal which is inputted; a second clamp circuit for clamping the output from the first clamp circuit according to predetermined timing; a switch circuit for selecting and outputting either the output from the first clamp circuit or the output from the second clamp circuit; and a sync separator circuit for separating and extracting a sync timing signal that is included in the video signal from the output from the switch circuit.

In the above described configuration of the present invention, the switch circuit selects and outputs either the output of the first or the second clamp circuit, and a sync timing signal that is included in the video signal is separated and extracted from the output of the switch circuit, and therefore, a sync signal can be stably separated from the video signal.

In the above described configuration of the present invention, it is preferable to further provide a clamp timing generator for generating a timing pulse, which defines the predetermined timing according to which the second clamp circuit clamps, from a sync timing signal that has been extracted by means of the sync separator circuit.

In addition, it is preferable to further provide a format detection circuit for determining the format of the video signal on the basis of a sync timing signal that has been extracted by means of the sync separator circuit, and generating format information which corresponds to each of the formats of the video signal.

In addition, it is preferable to further provide an AFC (Automatic Frequency Control) circuit for carrying out a phase locked loop operation using a sync timing signal that has been extracted by means of the sync separator circuit as a reference input signal.

Here, it is preferable for the second clamp circuit to operate within the sync signal period and carry out a clamp operation where the front edge portion is pulled into a constant DC voltage.

In this manner, the second clamp circuit operates within the sync signal period and carries out a clamp operation where the front edge portion is pulled into a constant DC voltage, and thereby, a sag of the vertical rate, that is superimposed over the video signal that is inputted, is absorbed, and a fluctuation in the voltage, in the case where the average DC voltage of the video signal suddenly changes, is absorbed, and thus, it becomes possible to carry out sync separation in the sync separator circuit with the position at which the sync signal is sliced being set at a constant level.

In addition, in the case of a configuration where a clamp timing generator is further provided, it is preferable for the timing pulse that is generated by the clamp timing generator to have a predetermined delay from the edge of the sync timing signal that has been extracted by means of the sync separator circuit, and for the second clamp circuit to operate in response to the timing pulse.

In this manner, the second clamp circuit operates in response to the timing pulse, and thereby, the previous output DC level can be maintained without the operation of the second clamp circuit in the case where a sync timing signal cannot be extracted in the sync separator circuit.

In addition, in the case of a configuration where a clamp timing generator is further provided, it is preferable for the clamp timing generator to change the period of the timing pulse in accordance with the width of the sync signal that differs depending on the format of the video signal on the basis of the format information that has been generated by the format detection circuit, and for the second clamp circuit to operate in response to the timing pulse.

In this manner, the period of the timing pulse is changed in accordance with the width of the sync signal that differs depending on the format of the video signal, and thereby, the timing pulse can be prevented from shifting to the outside of the sync signal so as to pull the pedestal pulse during the period of the video signal into the clamp voltage.

In addition, in the case of a configuration where a format detection circuit is further provided, it is preferable for the second clamp circuit to change the gain of the clamping in accordance with the period characteristics of the sync signal that differ depending on the format of the video signal by using the format information, and to pull the video signal into a clamp voltage.

In this manner, the gain of the clamping is changed using the format information, and thereby, the clamp characteristics can be made the same irrelevant of the period characteristics of the sync signal that differ depending on the format.

In addition, it is preferable for the second clamp circuit to carry out a clamp operation where the gain of the clamping is increased during the period of the vertical sync signal, and the gain of the clamping is decreased during the period of the horizontal sync signal on the effective display.

In such a configuration, the bottom of the sync signal can be pulled into the clamp voltage even during the vertical sync period where the DC voltage shifts greater than the sync signal during other horizontal sync periods.

In addition, in the case of a configuration where a format detection circuit is further provided, it is preferable for the switch circuit to select and output the output from the first clamp circuit in the case where the format information is not confirmed, and to select and output the output from the second clamp circuit in the case where the format information is confirmed.

In such a configuration, the output of the second clamp circuit can be prevented from being selected in a stage where the timing pulse is unstable.

In addition, in the case of a configuration where a format detection circuit is further provided, it is preferable for the format detection circuit to detect the vertical sync timing of the field timing or the frame timing of the video signal, and for the switch circuit to use the vertical sync timing (in the period of a vertical retrace line) of the field timing or the frame timing of the video signal which have been detected by the format detection circuit as the timing according to which the output from the first clamp circuit is switched to the output from the second clamp circuit.

In this manner, the vertical sync timing of the field timing or the frame timing of the video signal that has been detected by the format detection circuit is used as the timing according to which the output of the first clamp circuit is switched to the output of the second clamp circuit, and thereby, noise according to the timing of switching can be prevented from appearing on the display.

In addition, in the case of a configuration where an AFC (Automatic Frequency Control) circuit is further provided, it is preferable for the switch circuit to use the timing according to which the phase locked loop in the AFC circuit is converted from the locked state to the unlocked state as the timing according to which the output from the second clamp circuit is switched to the output from the first clamp circuit.

In this manner, the timing according to which the phase locked loop in the AFC circuit is converted from the locked state to the unlocked state is used as the timing according to which the output of the second clamp circuit is switched to the output of the first clamp circuit, and thereby, the second clamp circuit can be prevented from being operated by the timing pulse that has been set by the previous format information in the case where the video signal that is inputted changes.

As described above, according to the present invention, even when a video signal having a different format is inputted, the second clamp circuit maintains the bottom of the sync timing of the sync signal that is repeated during every horizontal period (H) at a constant DC voltage, and also maintains the timing of the edge that is sync separated by the sync separator circuit at a constant so that the jitter of the separated sync output signal can be reduced.

In addition, the width of the clamp pulse is controlled on the basis of the format information on the format detection circuit, and thereby, an efficient clamp operation can be carried out, and in addition, the vertical sync timing is used as the timing according to which the output from the first clamp circuit is switched to that from the second clamp circuit in the switch circuit, and thereby, noise at the time of switching can be prevented from appearing on the television set display. Accordingly, a configuration where four clamp circuits are used according to the prior art can be implemented with two clamp circuits.

BRIEF DESCRIPTION OF THE DRAWINGS

FIG. 2A is a diagram showing the locus of the bottom of the sync signal outputted from the first clamp circuit according to the present embodiment;

FIG. 2B is a diagram showing the input signal, the sync separated DC voltage of the comparator and the sync output signal according to the present embodiment;

FIG. 4 is a diagram showing the relationships between the video signal, the sync timing and the clamp pulse according to the present embodiment;

DESCRIPTION OF THE PREFERRED EMBODIMENTS

In the following, the embodiments according to the present invention are described in detail in reference to the drawings.

Figure 1:
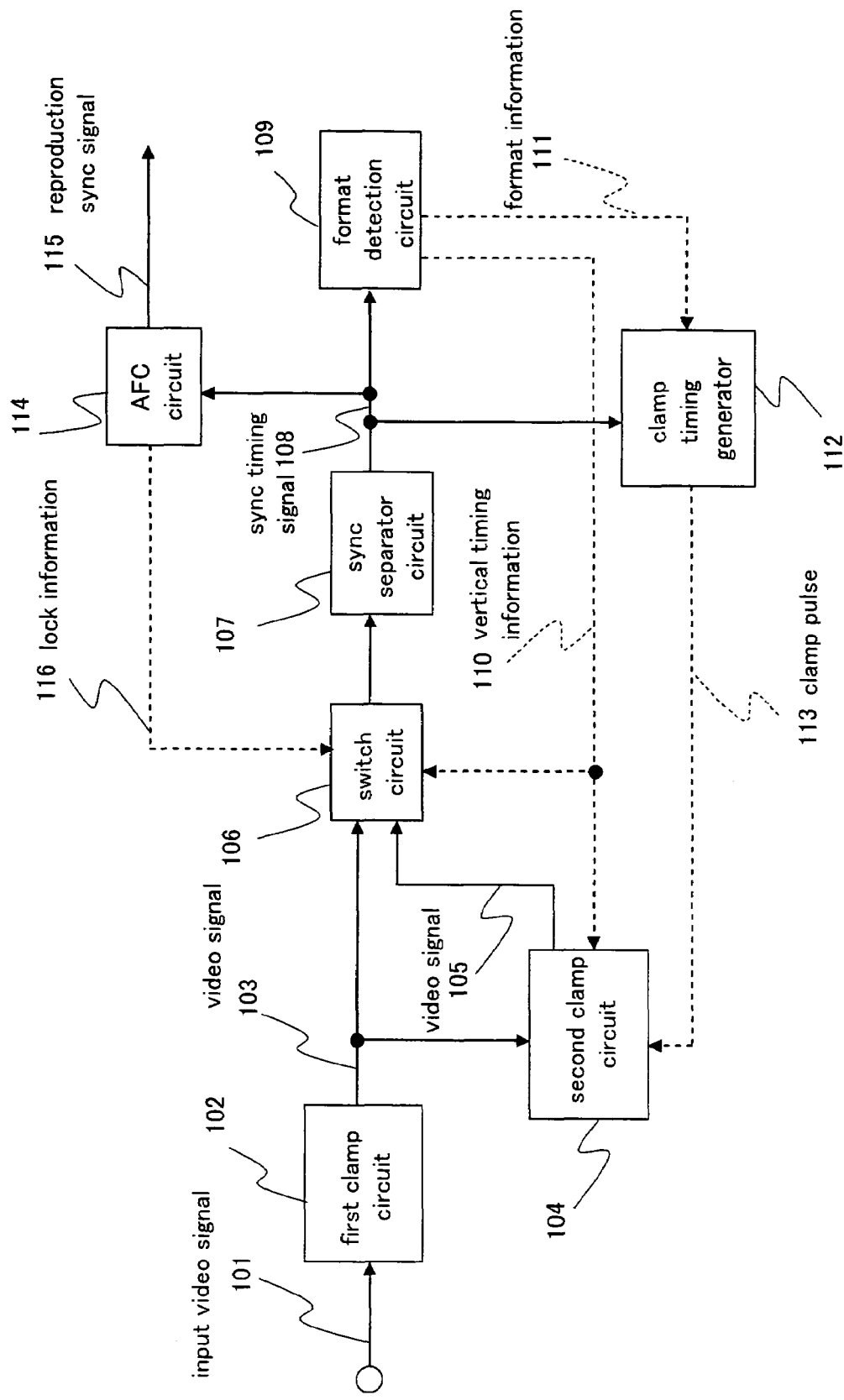
FIG. 1 is a diagram schematically showing the configuration of a sync separator apparatus according to an embodiment of the present invention.

FIG. 1 is a diagram schematically showing the configuration of a sync separator apparatus according to an embodiment of the present invention. In this sync separator apparatus, as shown in FIG. 1, an input video signal 101 is inputted into a first clamp circuit 102. The level of the signal that is clamped by first clamp circuit 102 (sync tip clamp) depends on the format of the inputted signal. Therefore, soft clamping is carried out in first clamp circuit 102 in such a manner that the sync level of the input signal becomes closer to the clamp voltage to a certain extent.

This soft clamping means to clamp the video signal at a constant voltage, concretely, by charging the capacitor that is connected in series to the input signal pin respectively during the sync signal period and discharging it during the video signal period.

Here, the soft clamping is carried out to the ends described below. That is to say, when a video signal is inputted from an external apparatus, the average DC level of a signal for a dynamic image or the like fluctuates a great deal, and waviness occurs in the case where the video signal is seen along the time axis. This waviness can be suppressed to a certain extent, by carrying out soft clamping.

A video signal 103 that has been clamped by first clamp circuit 102 is divided into two routes before being outputted. One is inputted into a second clamp circuit 104, and the other is inputted into a switch circuit 106. In second clamp circuit 104, a clamp pulse 113, which is a timing pulse for the clamping within the period of the sync signal that has been produced by a clamp timing generator 112 in the rear stage, is used for the clamping within the period of the sync signal in video signal 103.

Here, a video signal 105 that is outputted from second clamp circuit 104 is clamped in such a manner that the front edge portion of the sync signal is pulled into a constant DC voltage, and therefore, the waviness of a sag in the vertical rate that has been superimposed on video signal 103 can be absorbed.

Video signal 103 that is outputted from first clamp circuit 102 and video signal 105 that is outputted from second clamp circuit 104 are respectively inputted into switch circuit 106, and one of them is selected so as to be inputted into a sync separator circuit 107 in the rear stage.

In sync separator circuit 107, a sync timing signal 108 is taken out from the inputted video signal using a comparator or the like, and is outputted. This sync timing signal 108 is inputted into a format detection circuit 109, and vertical timing information 110 and format information 111 on the input video signal are detected. In addition, sync timing signal 108 is also inputted into a clamp timing generator 112. In clamp timing generator 112, the edge of sync timing signal 108 is used so as to generate a clamp pulse 113.

The above described vertical timing information 110 is a timing signal which appears during a vertical blanking interval, and is used as the period for vertical sync timing. The number of times that the horizontal sync timing appears within a period during which vertical sync timing appears once is confirmed, and thereby, the format of the input signal is confirmed.

The pulse period of clamp pulse 113 is changed using format information 111. In addition, sync timing signal 108 is used as the input reference signal of an AFC circuit 114, and thereby, the phase of sync timing signal 108 and the phase of the frequency divided signal of the oscillator inside of AFC circuit 114 are compared each other, and a phase locked loop operation is carried out. AFC circuit 114 outputs a reproduction sync signal 115 and lock information 116.

The sync separator apparatus shown in FIG. 1 is described in detail in the following. The output wave form of first clamp circuit 102 shown in FIG. 1 is shown in FIGS. 2A and 2B. FIG. 2A shows the locus of the bottom of the sync signal that is outputted from first clamp circuit 102. FIG. 2A shows two video signals which continue in the vertical rate, where the DC level raises upwardly in the vertical sync timing (1V) portions. The bottom of the sync signal at point A shown in FIG. 2A is low as the DC level, while the bottom of the sync signal at point B is high as the DC level. Therefore, when the sync signal, having different voltages of the DC level at point A and point B, is sync separated by means of the comparator of the sync separator circuit, as shown in FIG. 2B, the upper side of the sync signal for the sync signal at point A and the lower side of the sync signal for the sync signal at point B are respectively sliced by means of the DC voltage of the comparator.

The sync output signal that has been sliced and outputted has a large width of disparity in such a manner that the time from the point where declining starts in the sync signal within the input signal becomes a period of time X1 and a period of time Y1, respectively. This is nothing but a jitter, and becomes a jitter in the video that is reproduced on the television display.

Figure 3A:
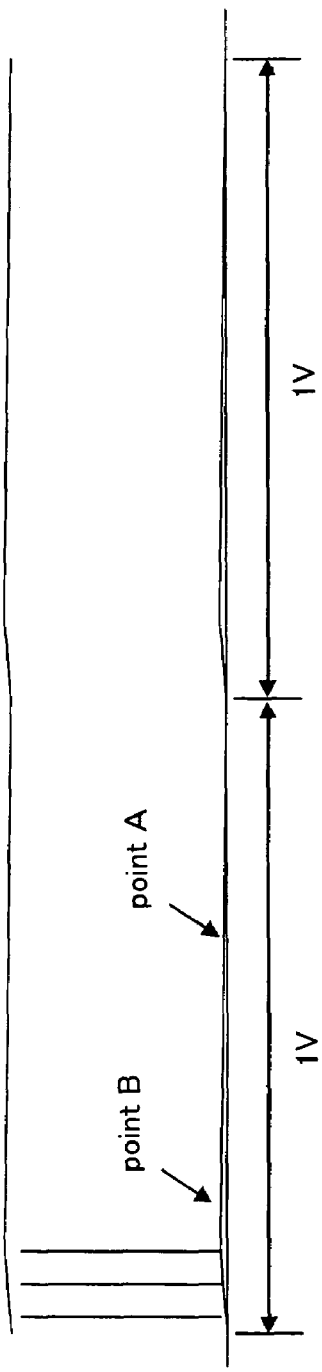
FIG. 3A is a diagram showing the locus of the bottom of the sync signal outputted from the second clamp circuit according to the present embodiment.
Figure 3B:
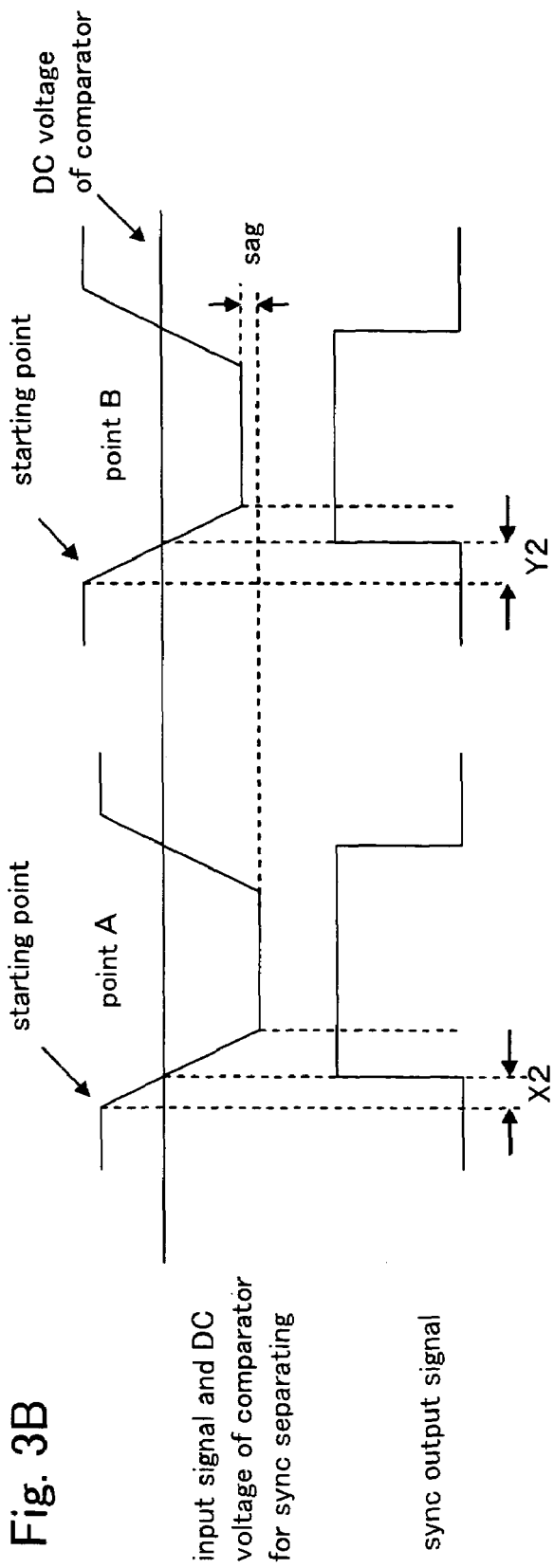
FIG. 3B is a diagram showing the input signal, the sync separated DC voltage of the comparator and the sync output signal according to the present embodiment.

Therefore, second clamp circuit 104 is used to provide a method for reducing the jitter of the sync output signal. In second clamp circuit 104, clamping is carried out so as to pull the bottom of the sync signal within the video signal into a constant voltage. The output wave form of second clamp circuit 104 is shown in FIGS. 3A and 3B. FIG. 3A shows two video signals, which continue in the vertical rate, where the bottom of the sync signal is pulled into a constant voltage, and therefore, most of the waviness of the sag in the vertical rate is absorbed. Therefore, as shown in FIG. 3B, in the case where the output of second clamp circuit 104 is sync separated, the period of time X2 and the period of time Y2 of the sync output signal at point A and point B become approximately the same from the point where declining starts in the sync signal within the input signal, indicating a small width of disparity. In the case where a video is displayed using such a sync signal, a jitter in the video that is reproduced on the television display becomes small.

Next, the production of clamp pulse 113, for the operation of second clamp circuit 104, from the edge of sync timing signal 108 that has been extracted from sync separator circuit 107 is described in reference to FIG. 4. As shown in FIG. 4, sync timing signal 108 is extracted for the sync signal within the video signal by means of the sync separated slice DC voltage in the comparator sync separator circuit 107. Here, in clamp timing generator 112, the edge on the front side of sync timing signal 108 is used so as to produce clamp pulse 113.

Concretely, the edge on the front side of sync timing signal 108 is used for the trigger timing, and the timing is set for the inclining edge of clamp pulse 113 through counting using an external clock or the like. Then, the counting is further continued and the timing is set for the declining edge of clamp pulse 113. The width of clamp pulse 113 is adjusted to an appropriate width using format information 111 that has been gained from format detection circuit 109. Clamp pulse 113 is produced in this manner, and therefore, clamp pulse 113 can be prevented from shifting to the outside of the sync signal so as to pull the pedestal pulse during the period of the video signal into the clamp voltage.

Next, the reasons why format information 111 is used for the determination of the width of clamp pulse 113 are described. In the case of a video signal of 480i, for example, the period of the sync signal is 4.7 μsec while the period of the sync signal becomes as short as 540 nsec in the case of 720p/60 (progressive signal having a number of scanning lines of 720 in NTSC system). Therefore, the pulling of the clamp can be carried out stably, and the time for pulling can be made short when the width of clamp pulse 113 is efficiently varied using format information 111 rather than the width being set at a fixed value from the start.

In addition, clamp pulse 113 is produced from sync timing signal 108, and therefore, clamp pulse 113 is not produced according to the timing where there is no sync signal within the input video signal. Therefore, second clamp circuit 104 can be prevented from operating during the period where there is no sync signal. Accordingly, second clamp circuit 104 maintains the state of the previous output DC level.

Furthermore, in the case where the operation gain of the clamp is controlled using format information 111 during the period of clamp pulse 113 where second clamp circuit 104 operates, clamping can be carried out taking into account the horizontal sync period which differs depending on the format. (Table 1) shows, for example, the horizontal frequencies, the lengths of one horizontal period, and the lengths of the sync signal of 480p and 1080i/60. (Table 1) shows that the ratio of the period of the sync signal in one horizontal period (H) is 7.3% for 480p while the corresponding ratio is 2.0% for 1080i/60. That is to say, the clamp characteristics, which are the same as those when the clamp gain becomes approximately 3.6 times greater than that at the time of a signal input of 480p, can be implemented at the time of a signal input of 1080i/60 during the period of operation of second clamp circuit 104.

TABLE 1

|  | Horizontal frequency [kHz] | Wave length of 1H [μsec] | Width of sync signal [nsec] |
| --- | --- | --- | --- |
| 480P | 31.469 | 31.78 | 2330 |
| 1080i/60 | 33.716 | 29.66 | 590 |

Figure 5:
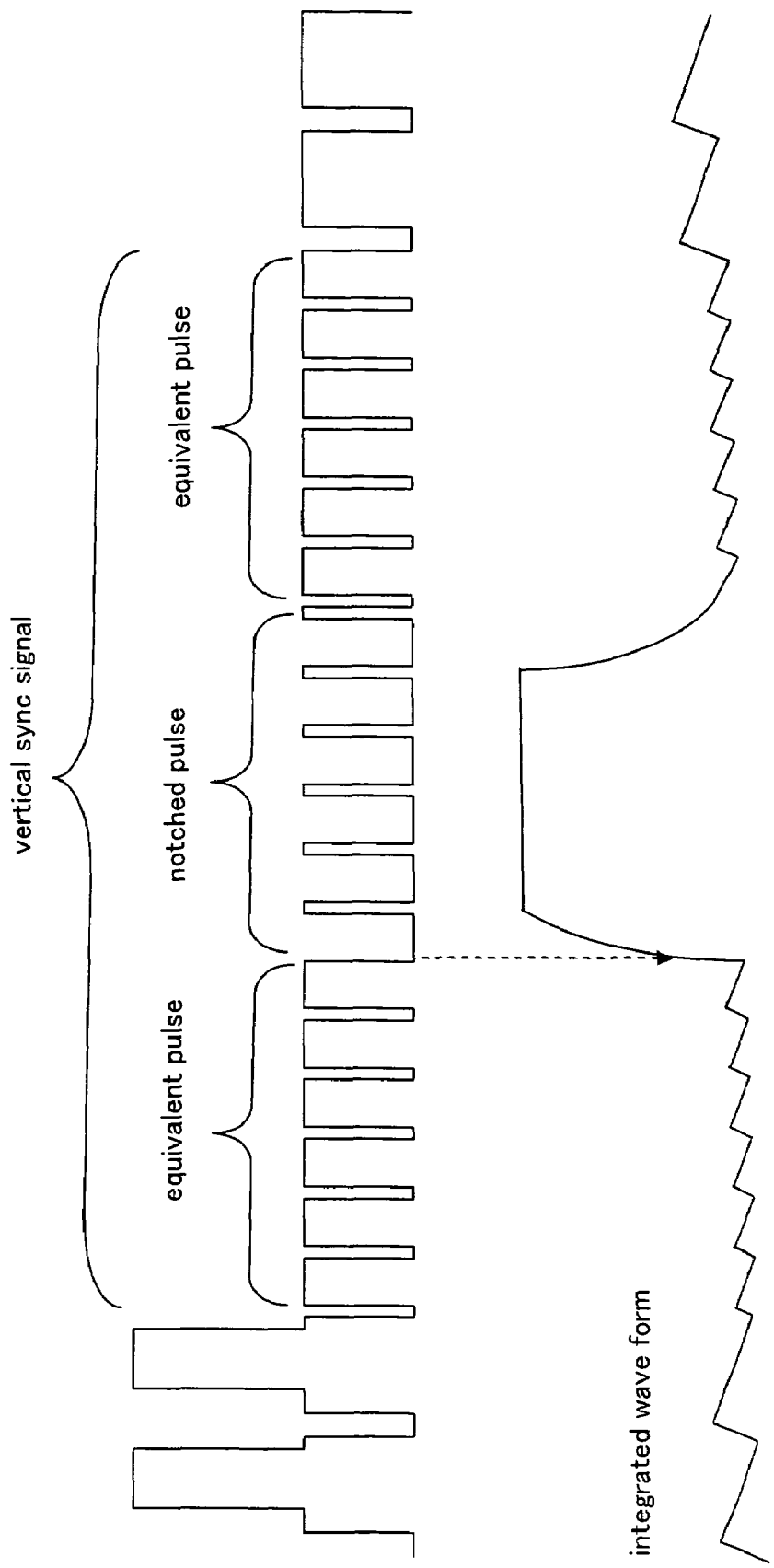
FIG. 5 is a diagram showing the wave form of a representative 480i signal during the vertical sync period and the integrated wave form during this period.

In addition, switching of the clamp gain for the operation of second clamp circuit 104 is also carried out within one vertical period in the case where the input signal is constant without being switched. The sag in input video signal 101 tends to become great during the period of the vertical sync signal due to the difference in the format of the wave form of the sync signal. FIG. 5 shows the wave form of a representative 480i signal during the vertical sync period and the integrated wave form during this period. The period of "low" is set so as to be long in the portion of a notched pulse within the vertical sync signal in order for the detection of the vertical sync timing to be carried out easily using an integration circuit in the receiver.

Therefore, the average DC voltage of a signal easily shifts during the vertical sync period in comparison with the other horizontal sync period. A sag cannot be suppressed when a signal having waviness due to a sag is inputted into first clamp circuit 102 through the vertical rate due to the signal characteristics as described above. Therefore, vertical timing information 110 that is detected by format detection circuit 109 in the rear stage using second clamp circuit 104 is used so as to increase the gain by means of second clamp circuit 104 during the vertical timing period. As a result of this, the bottom of the sync signal can be pulled into the clamp voltage even during the vertical sync period where the DC voltage shifts greater than the sync signal during the other horizontal sync period.

In addition, vertical timing information 110 on format detection circuit 109 is used when the output of switch circuit 106 in the sync separator apparatus is selected. When vertical timing information 110 is not confirmed, video signal 103, outputted from first clamp circuit 102, is selected by switch circuit 106 so as to be outputted. Then, after vertical timing information 110 has been confirmed, the signal is switched to video signal 105 which is an output that has been sufficiently pulled into the clamp voltage by second clamp circuit 104, and thereby, the output of second clamp circuit 104 is prevented from being inputted into sync separator circuit 107 in the stage where clamp pulse 113 is unstable.

Figure 6:
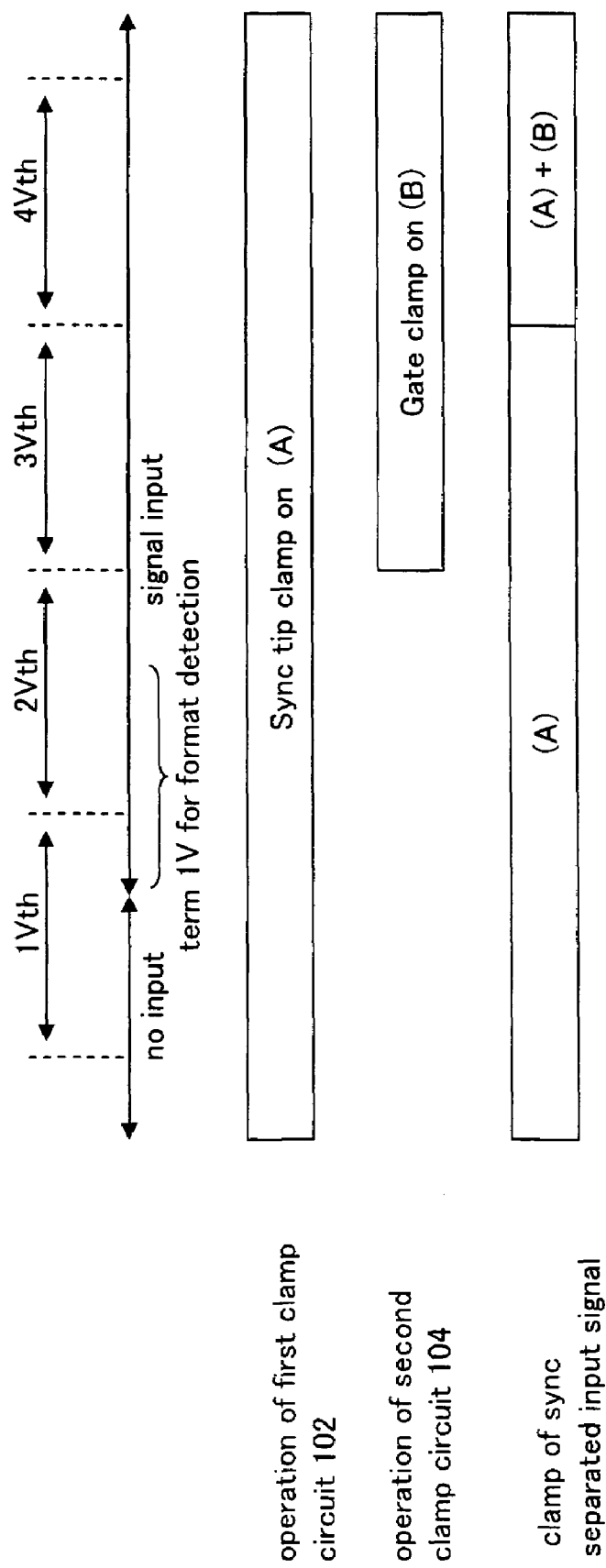
FIG. 6 is a diagram showing a switching in the clamping of the sync separator apparatus from the time of no input to the state in which signal input is started according to the present embodiment.

Here, the state where the clamp is switched when a signal input is started from the time of no input in which there is no signal input into the sync separator apparatus is described in reference to FIG. 6. In FIG. 6, the output of first clamp circuit 102 is inputted into sync separator circuit 107 in the time of no input in 1Vth, and when the format that has been confirmed over the period of 1V is verified in 2Vth at the beginning of 3Vth, second clamp circuit 104 also operates. However, 3Vth is the initial stage where the format is verified and there is a possibility that video signal 105 is not sufficiently pulled into the clamp voltage, and therefore, switch circuit 106 selects the output of first clamp circuit 102. Then, the output of switch circuit 106 selects the output of second clamp circuit 104 from the beginning of 4Vth when the output of second clamp circuit 104 is sufficiently pulled into the clamp voltage.

In this manner, the output of switch circuit 106 is switched from the output of first clamp circuit 102 to the output of second clamp circuit 104 after the format of input video signal 101 has been verified, and thereby, stable switching can be implemented. In addition, as shown in FIG. 6, the timing of the switching is set to the vertical sync timing (in the period of a vertical retrace line) of the field timing or the frame timing, and thereby, noise at the time of switching can be prevented from appearing on the television display in the final output.

In addition, format detection circuit 109 can be formed by counting the number of times when the horizontal sync timing appears within one vertical period. In addition, the number of times when the horizontal sync timing appears within one vertical period is the same between 1080i/60, which is an HD based signal in the NTSC system, and 1080i/50, which is an HD based signal in the PAL system, and therefore, the difference between the PAL system and the NTSC system can be confirmed by counting the number of periods of the horizontal sync timing using a clock or the like so that the format can be verified by judging the difference together with information on the above described number of times when the horizontal sync timing appears within one vertical period.

In sync separator circuit 107, in the case where the number of the outputted sync timing signals 108 is counted during one vertical period when the output of first clamp circuit 102 having a sag in the vertical rate is used as the input signal and when the output of second clamp circuit 104 is used, there is a possibility that the number becomes slightly smaller due to the influence of the sag in the case where the output of first clamp circuit 102 is sync separated than in the case where the output of second clamp circuit 104 is sync separated.

However, the total number of horizontal sync signals which form one vertical period differs by approximately several tens of horizontal periods (H) between the formats of respective signals, and therefore, this error in the number does not become a problem in determining the format. Accordingly, usage of only the output of first clamp circuit 102 does not become a problem in detecting the format, and no problem arises when format information 111, that has been gained by sync separating and counting the output of first clamp circuit 102, is used for the timing of the switching of switch circuit 106.

Figure 7:
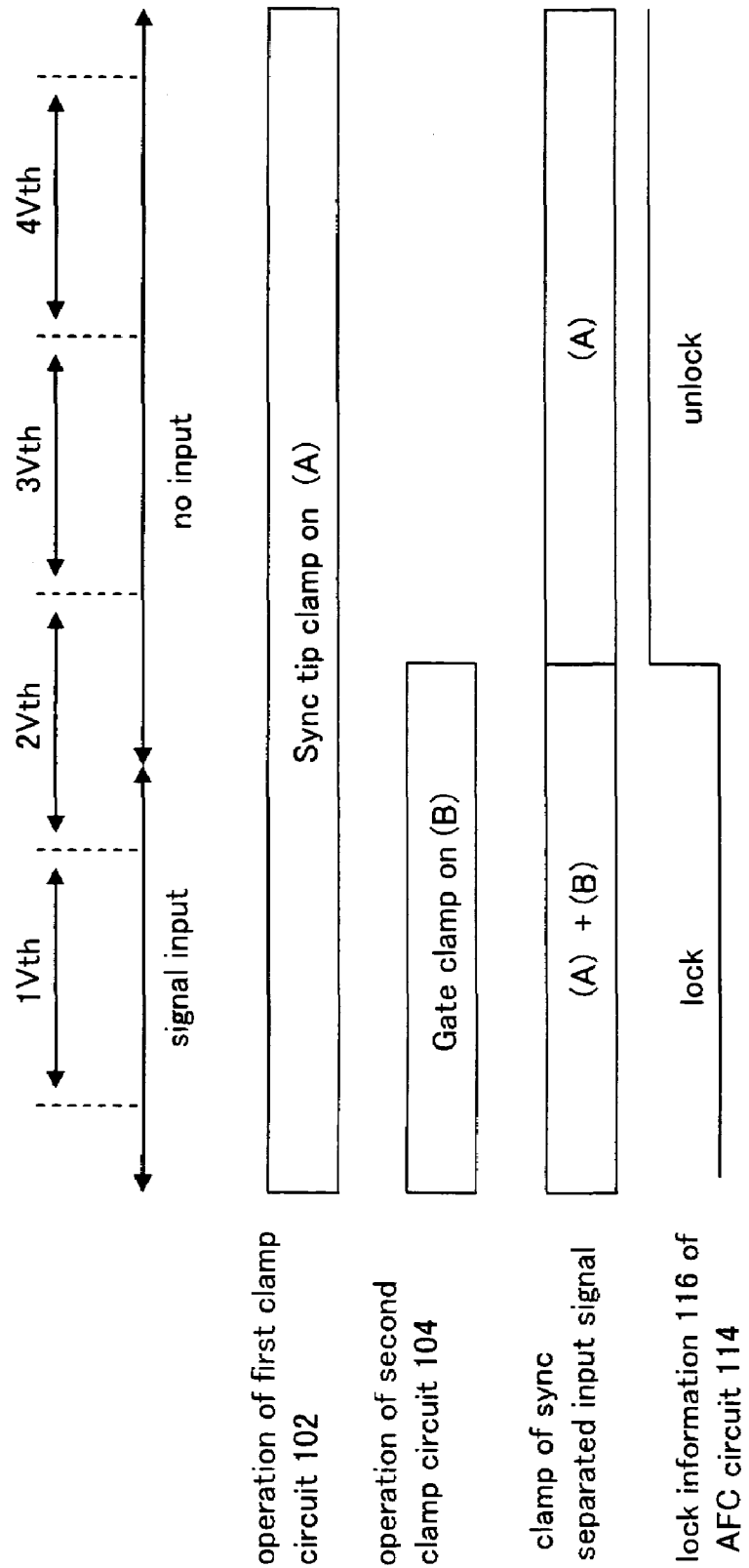
FIG. 7 is a diagram showing a switching in the clamping of the sync separator apparatus from the time of signal input to the state of no input according to the present embodiment.
Figure 8:
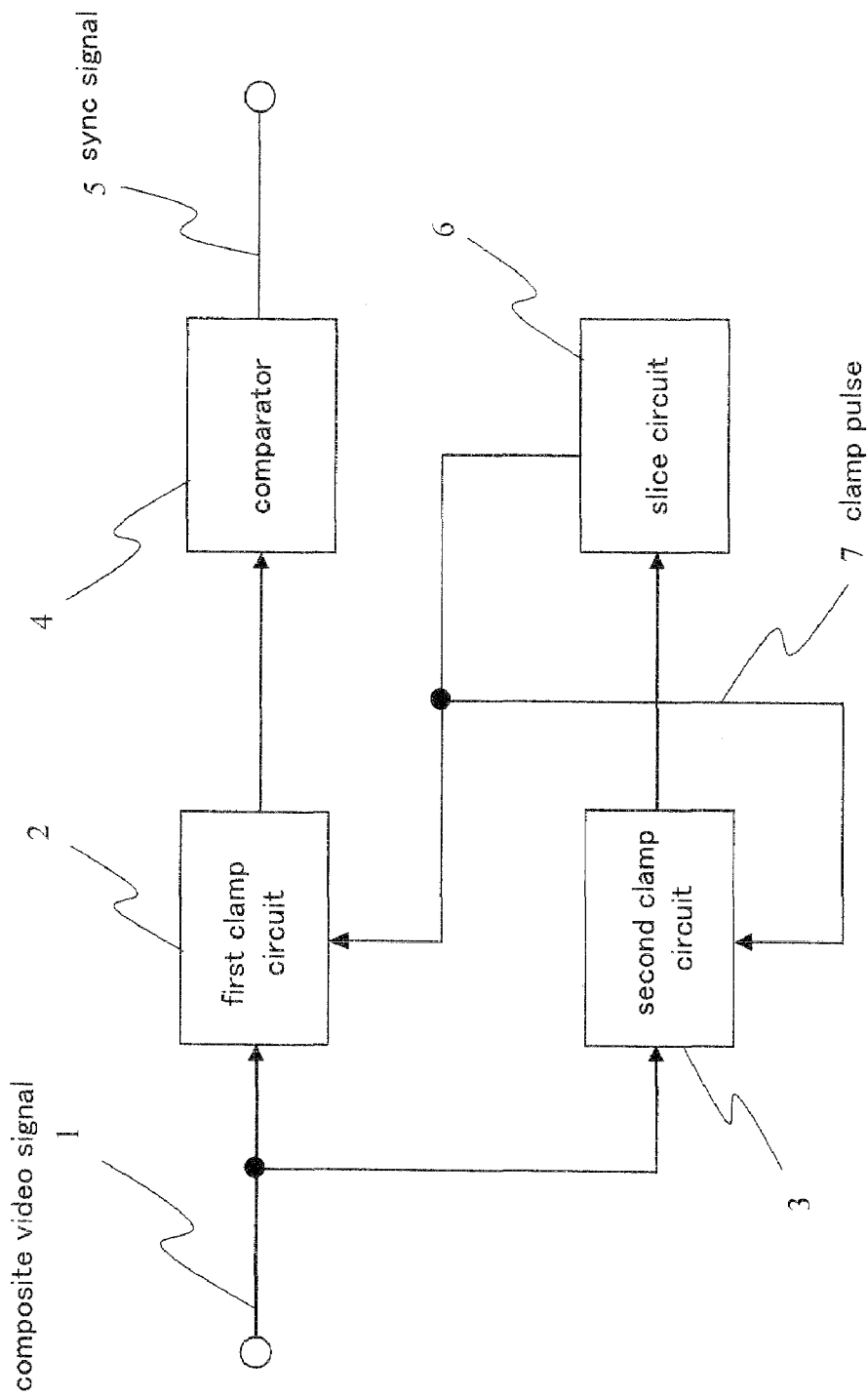
FIG. 8 is a diagram schematically showing the configuration of a sync separator apparatus according to the prior art.

In addition, as for the timing of the switching of the output of switch circuit 106 from the output of second clamp circuit 104 to the output of first clamp circuit 102, the timing according to which the frequency of AFC circuit 114 is changed from the locked state to the unlocked state is used as lock information 116 on AFC circuit 114 in the rear stage. FIG. 7 shows a signal that is inputted into sync separator circuit 107 in the case where the state is switched to no input from the time of a signal input. In FIG. 7, the output of second clamp circuit 104 is selected by switch circuit 106 for sync separation in 1Vth where AFC circuit 114 is locked. However, the output of switch circuit 106 is switched from the output of second clamp circuit 104 to the output of first clamp circuit 102 according to the timing when lock information 116 on AFC circuit 114 is changed from the locked state to the unlocked state.

As a result of this, in the case where the format of the input signal is changed according to the timing from somewhere, the output of second clamp circuit 104 is instantly switched to the output of first clamp circuit 102. As a result of this, the occurrence of a malfunction, where the period of operation of clamp pulse 113 that is controlled by format information 111 spreads from the period of the sync signal to the period of the video signal so as to pull the pedestal pulse into the clamp voltage, can be prevented.

Here, the video signal that is used in the description of the present embodiment is a signal that includes a sync timing signal, and means, for example, a composite video signal, a brightness signal (SY) which is a component signal, and a green (G) signal on which a sync signal has been superimposed.

INDUSTRIAL APPLICABILITY

A sync separator apparatus according to the present invention can carry out an efficient clamp operation where the jitter of a sync output signal that is sync separated from a video signal is reduced, and the width of the clamp pulse is controlled on the basis of the format information even when a video signal having a different format is inputted, and is useful for separating a sync signal that is required for displaying a video from a video signal in a display unit such as a television set having a function of receiving a video signal.

What is claimed is:

1. A sync separator apparatus, comprising:
   a first clamp circuit for sync tip clamping a video signal which is inputted;
   a second clamp circuit for clamping the output from said first clamp circuit according to predetermined timing;
   a switch circuit for selecting and outputting either the output from said first clamp circuit or the output from said second clamp circuit; and
   a sync separator circuit for separating and extracting a sync timing signal that is included in said video signal from the output from said switch circuit.

2. The sync separator apparatus according to claim 1, further comprising a clamp timing generator for generating a timing pulse, which defines said predetermined timing according to which said second clamp circuit clamps, from a sync timing signal that has been extracted by means of said sync separator circuit.

3. The sync separator apparatus according to claim 2, further comprising a format detection circuit for determining the format of said video signal on the basis of a sync timing signal that has been extracted by means of said sync separator circuit, and generating format information which corresponds to each of the formats of the video signal.

4. The sync separator apparatus according to claim 3, further comprising an AFC (Automatic Frequency Control) circuit for carrying out a phase locked loop operation using a sync timing signal that has been extracted by means of said sync separator circuit as a reference input signal.

5. The sync separator apparatus according to claim 4, wherein said switch circuit uses the timing according to which the phase locked loop in said AFC circuit is converted from the locked state to the unlocked state as the timing according to which the output from said second clamp circuit is switched to the output from said first clamp circuit.

6. The sync separator apparatus according to claim 3, wherein
   said clamp timing generator changes the period of said timing pulse in accordance with the width of the sync signal that differs depending on the format of said video signal on the basis of said format information that has been generated by said format detection circuit, and
   said second clamp circuit operates in response to said timing pulse.

7. The sync separator apparatus according to claim 3, wherein said second clamp circuit changes the gain of the clamping in accordance with the period characteristics of the sync signal that differ depending on the format of said video signal by using said format information, and pulls said video signal into a clamp voltage.

8. The sync separator apparatus according to claim 3, wherein
said format detection circuit detects the vertical sync timing of the field timing or the frame timing of the video signal, and
said switch circuit uses the vertical sync timing of the field timing or the frame timing of the video signal which have been detected by said format detection circuit as the timing according to which the output from said first clamp circuit is switched to the output from said second clamp circuit.

9. The sync separator apparatus according to claim 2, wherein
said timing pulse that is generated by said clamp timing generator has a predetermined delay from the edge of said sync timing signal that has been extracted by means of said sync separator circuit, and
said second clamp circuit operates in response to said timing pulse.

10. The sync separator apparatus according to claim 1, wherein said second clamp circuit operates within the sync signal period and carries out a clamp operation where the front edge portion is pulled into a constant DC voltage.

11. The sync separator apparatus according to claim 1, wherein said second clamp circuit carries out a clamp operation where the gain of the clamping is increased during the period of the vertical sync signal, and the gain of the clamping is decreased during the period of the horizontal sync signal on the effective display.

12. The sync separator apparatus according to claim 1, wherein said switch circuit selects and outputs the output from said first clamp circuit in the case where said format information is not confirmed, and selects and outputs the output from said second clamp circuit in the case where said format information is confirmed.

* * * * *

UNITED STATES PATENT AND TRADEMARK OFFICE
CERTIFICATE OF CORRECTION

PATENT NO. : 7,580,078 B2  Page 1 of 1
APPLICATION NO. : 11/336783
DATED : August 25, 2009
INVENTOR(S) : Yasuhiro Uno It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this

Fourteenth Day of September, 2010

David J. Kappos
*Director of the United States Patent and Trademark Office*